(12) United States Patent
Abulila et al.

(10) Patent No.: US 12,705,177 B2
(45) Date of Patent: Aug. 11, 2026

(54) PROVIDING LOCATION-BASED PREFETCHING IN PROCESSOR-BASED DEVICES

(71) Applicant: Microsoft Technology Licensing, LLC, Redmond, WA (US)

(72) Inventors: Ahmed Abulila, Raleigh, NC (US); Rami Mohammad Al Sheikh, Morrisville, NC (US); Saransh Jain, Raleigh, NC (US); Daren Eugene Streett, Cary, NC (US); Michael Scott Mcilvaine, Raleigh, NC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/993,681

(22) Filed: Nov. 23, 2022

(65) Prior Publication Data

US 2024/0168885 A1 May 23, 2024

(51) Int. Cl.
*G06F 12/0862* (2016.01)
*G06F 12/02* (2006.01)
*G06F 13/16* (2006.01)

(52) U.S. Cl.
CPC ...... *G06F 12/0862* (2013.01); *G06F 12/0238* (2013.01); *G06F 13/1673* (2013.01)

(58) Field of Classification Search
CPC ............. G06F 12/0862; G06F 12/0238; G06F 13/1673
See application file for complete search history.

(56) References Cited

U.S. PATENT DOCUMENTS

| | | | | |
|---|---|---|---|---|
| 8,255,633 | B2 * | 8/2012 | Boyle | G06F 12/0862 711/3 |
| 9,690,707 | B2 * | 6/2017 | Chou | G06F 9/3802 |
| 11,080,195 | B2 * | 8/2021 | Gal-On | G06F 12/0862 |
| 2010/0235579 | A1 | 9/2010 | Biles et al. | |
| 2011/0113199 | A1 | 5/2011 | Tang et al. | |
| 2012/0030431 | A1 | 2/2012 | Anderson et al. | |

(Continued)

FOREIGN PATENT DOCUMENTS

WO 2021118645 A1 6/2021

OTHER PUBLICATIONS

International Search Report and Written Opinion received for PCT Application No. PCT/US23/033772, Jan. 22, 2024, 15 pages.

*Primary Examiner* — Gary W. Cygiel

(57) ABSTRACT

Providing location-based prefetching in processor-based devices is disclosed. In this regard, a processor-based device comprises a location-based prefetcher circuit associated with a first cache memory device having a faster access time and a smaller capacity than a second cache memory device. The location-based prefetcher circuit identifies an association between a first memory address of a first memory access request and a second memory address of a subsequent second memory access request, and determines a set and a way of the second cache memory device where data corresponding to the second memory address is stored. The location-based prefetcher circuit then stores, in a prefetcher array entry of a prefetcher array, the first memory address as a trigger memory address, and a set indicator and a way indicator of the set and the way, respectively, of the second cache memory device as a target identifier.

20 Claims, 7 Drawing Sheets

(56) References Cited

U.S. PATENT DOCUMENTS

Figure 1:
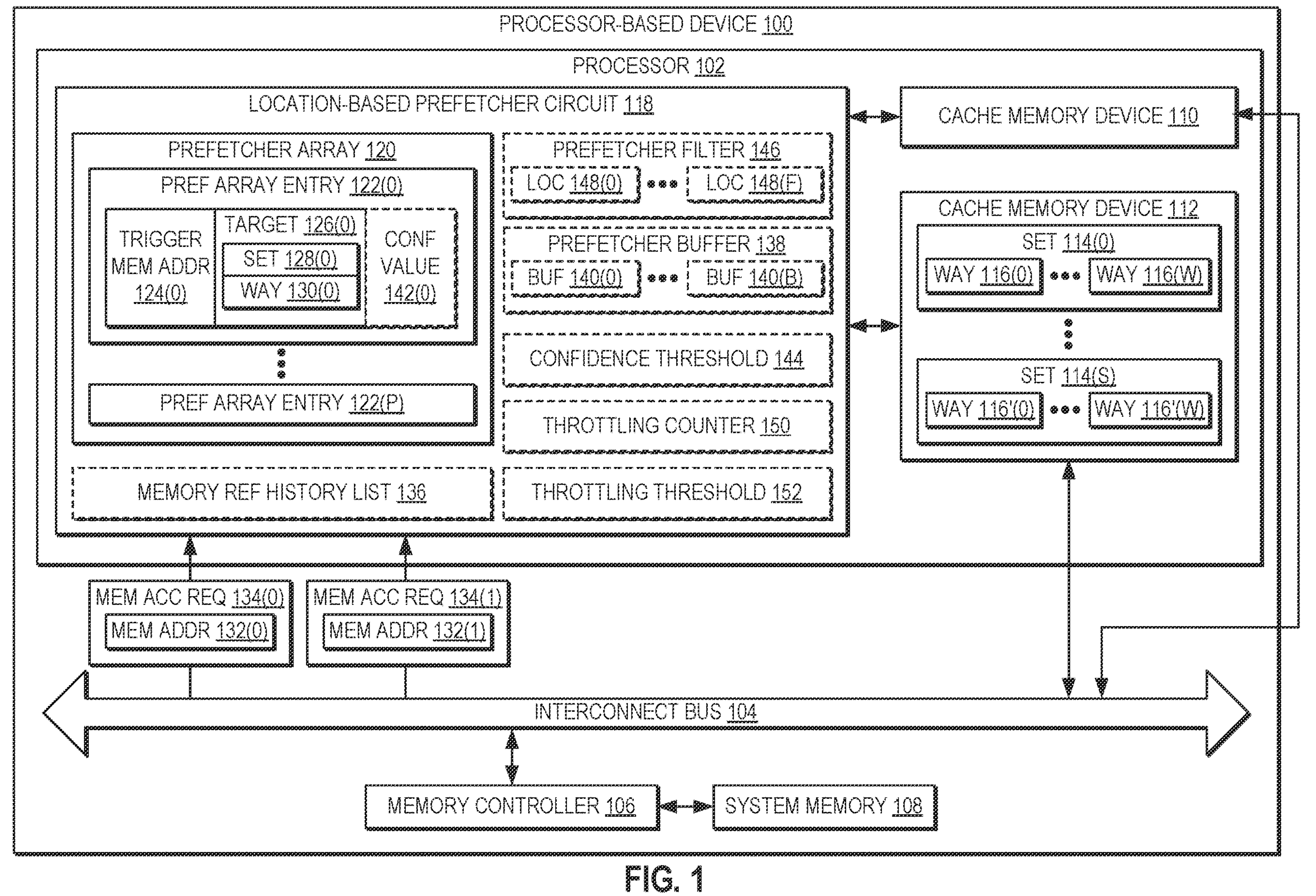

| | | | | |
|---|---|---|---|---|
| 2012/0072671 | A1 | 3/2012 | Chirca et al. | |
| 2012/0131311 | A1 | 5/2012 | Chou | |
| 2013/0339617 | A1* | 12/2013 | Averbouch .......... | G06F 12/0862 711/E12.07 |
| 2017/0371790 | A1 | 12/2017 | Dwiel | |
| 2018/0181402 | A1 | 6/2018 | Zhang et al. | |
| 2020/0301840 | A1 | 9/2020 | Reed et al. | |
| 2022/0309000 | A1* | 9/2022 | Campbell ........... | G06F 12/0864 |

* cited by examiner

PROVIDING LOCATION-BASED PREFETCHING IN PROCESSOR-BASED DEVICES

FIELD OF THE DISCLOSURE

The technology of the disclosure relates to prefetching and storing data for a multi-level cache memory or structure, and, more particularly, to more efficiently storing prefetched data.

BACKGROUND

Memory access latency in processor-based devices refers to an interval between the time a processor initiates a memory access request for data (i.e., by executing a memory load instruction), and the time the processor actually receives the requested data. Memory access latency may negatively affect processor performance if the time interval is large enough that the processor is forced to stall further execution of instructions while waiting for the memory access request to be fulfilled. One approach to minimizing the effects of memory access latency is the use of cache memory, also referred to simply as "cache." A cache is a memory device that has a smaller capacity than system memory, but that can be accessed faster by a processor due to the type of memory used and/or the physical location of the cache relative to the processor. The cache can be used to reduce memory access latency by storing copies of data retrieved from frequently accessed memory locations in the system memory or from another, higher-level cache (i.e., a cache further from the processor).

Modern processor-based devices employ a memory hierarchy that includes system memory along with multiple levels of cache memory located between the system memory and the processor. Levels of cache memory that are closer to the processor (i.e., lower-level caches) have faster access times and smaller storage capacities, while levels of cache memory that are further from the processor have slower access times and larger storage capacities. When a memory access request is received from the processor, the first level cache (i.e., the smallest, fastest cache that is located closest to the processor) is queried to see if the requested data is stored therein. If not, the memory access request is forwarded to the next higher cache level in the memory hierarchy (and possibly to the system memory), which may result in increased memory access latency.

To mitigate this scenario, processor-based devices may employ a prefetcher that attempts to fetch data from a higher-level cache (or from the system memory) and place it into a lower-level cache memory before the data is actually requested by the processor. To accomplish this, conventional prefetchers track memory access patterns to identify correlations between a current memory access request and previous memory access requests or processor activities. Once the prefetcher correlates a previously accessed memory address (i.e., the "trigger") with a memory address being currently accessed (i.e., the "target"), subsequent occurrences of memory access requests to the trigger address will cause the prefetcher to retrieve the data stored at the target memory address. Prefetchers conventionally track triggers and targets using corresponding full or partial cache-line addresses, which results in increased accuracy at the cost of significant storage space.

SUMMARY

Exemplary embodiments disclosed herein include providing location-based prefetching in processor-based devices. In this regard, in one exemplary embodiment, a processor-based device provides a location-based prefetcher circuit. As used herein, "location-based" refers to the location-based prefetcher circuit being configured to store a location of the data corresponding to a target memory address in a next-higher-level cache, instead of storing all or part of the target memory address itself. Accordingly, the location-based prefetcher circuit comprises a prefetcher array that stores a plurality of prefetcher array entries. Each of the prefetcher array entries stores a trigger memory address and a target identifier that comprises a set indicator and a way indicator representing a set and a way, respectively, of a next-higher-level cache in which data corresponding to the target memory address is stored. The location-based prefetcher circuit is associated with a first cache memory device that has a faster access time and a smaller capacity than a second cache memory device (i.e., the next-higher-level cache).

In exemplary operation, the location-based prefetcher circuit populates the prefetcher array by first identifying an association between a first memory address of a first memory access request and a second memory address of a subsequent second memory access request. The location-based prefetcher circuit next determines a set and a way of the second cache memory device in which data (e.g., a cache line) corresponding to the second memory address is stored. Some embodiments may provide that the set and the way are determined by the location-based prefetcher circuit based on location information provided by the second cache memory device when providing prefetched data. The location-based prefetcher circuit then stores the first memory address as the trigger memory address of a prefetcher array entry, and also stores a set indicator and a way indicator of the set and the way, respectively, of the second cache memory device as the target identifier of the prefetcher array entry. In some embodiments, the set indicator of each target identifier may comprise a number N of bits, wherein N is the binary logarithm of a count of sets of the second cache memory device, while the way indicator of each target identifier may comprise a number W of bits, wherein W is the binary logarithm of a count of ways of the second cache memory device.

Because each prefetcher array entry stores the set indicator and the way indicator instead of the target memory address, each prefetcher array entries requires fewer bits of data. This enables the location-based prefetcher have a larger capacity than conventional prefetchers while occupying the same area and consuming the same amount of power, or to have the same capacity as conventional prefetchers while occupying a smaller area and consuming less power. Moreover, embodiments of the location-based prefetcher circuit disclosed herein can achieve greater energy efficiency and can apply the approach described herein to any multi-level cache or data structure.

Some embodiments of the location-based prefetcher circuit may provide additional data structures to further improve performance. For example, in some embodiments, the location-based prefetcher circuit may provide a memory references history list, in which a plurality of memory addresses corresponding to observed memory access requests are stored. The location-based prefetcher circuit may populate the memory references history list as memory access requests are observed and may subsequently use the memory references history list to identify an association between a trigger memory address and a target memory address.

Some embodiments may further provide that the location-based prefetcher circuit may perform prefetching by first observing a subsequent memory access request to the first memory address, and then determining that the first memory address corresponds to the trigger memory address of a prefetcher array entry. The location-based prefetcher uses the set indicator and the way indicator of the target identifier of the prefetcher array entry to prefetch data by retrieving the data stored in the set and the way of the second cache memory device identified by the set indicator and the way indicator, respectively. The retrieved data in some embodiments may be stored in a prefetcher buffer entry of a prefetcher buffer of the location-based prefetcher circuit. In such embodiments, when the location-based prefetcher circuit observes a subsequent memory access request to the second memory address, the location-based prefetcher circuit may promote the prefetcher buffer entry storing the retrieved data from the prefetcher buffer to the first cache memory device.

In some embodiments, each prefetcher array entry of the prefetcher array may further include a confidence value that is incremented or decremented when the location-based prefetcher observes positive or negative confidence events, respectively, associated with the target memory address corresponding to the prefetcher array entry. If the confidence value for a prefetcher array entry falls below a confidence threshold, the location-based prefetcher circuit in such embodiments may delete the prefetcher array entry. Some embodiments of the location-based prefetcher circuit may also comprise a prefetcher filter that tracks target locations of recent prefetches (e.g., a set indicator and a way indicator for each recent prefetch). Before retrieving data from the second cache memory device, the location-based prefetcher circuit consults the prefetcher filter to see if a target location corresponding to the target memory address is stored therein, and only performs the data retrieval if the target location corresponding to the target memory address is not found in the prefetcher filter.

According to some embodiments, the location-based prefetcher circuit further provides a throttling counter that is incremented or decremented when the location-based prefetcher circuit observes events indicating negative cache performance or positive cache performance, respectively. If the throttling counter exceeds a throttling threshold, the location-based prefetcher circuit in such embodiments may throttle prefetching (e.g., by suspending prefetching operations of the location-based prefetcher circuit for a specified time interval).

In another exemplary embodiment, a processor-based device is provided. The processor-based device comprises a first cache memory device and a second cache memory device, wherein the first cache memory device has a faster access time and a smaller capacity than the second cache memory device. The processor-based device further comprises a location-based prefetcher circuit associated with the first cache memory device, the location-based prefetcher circuit comprising a prefetcher array comprising a plurality of prefetcher array entries. The plurality of prefetcher array entries includes a corresponding plurality of trigger memory addresses and a corresponding plurality of target identifiers, each of which comprises a set indicator and a way indicator. The location-based prefetcher circuit is configured to identify an association between a first memory address of a first memory access request and a second memory address of a subsequent second memory access request. The location-based prefetcher circuit is further configured to determine a set and a way of the second cache memory device in which data corresponding to the second memory address is stored. The location-based prefetcher circuit is also configured to store, in a prefetcher array entry of the plurality of prefetcher array entries, the first memory address as a trigger memory address prefetcher array entry, and a set indicator and a way indicator of the set and the way, respectively, of the second cache memory device as the target identifier of the prefetcher array entry.

In another exemplary embodiment, a method for providing location-based prefetching is provided. The method comprises identifying, by a location-based prefetcher circuit associated with a first cache memory device of a processor-based device, an association between a first memory address of a first memory access request and a second memory address of a subsequent second memory access request. The method further comprises determining, by the location-based prefetcher circuit, a set and a way of a second cache memory device in which data corresponding to the second memory address is stored, wherein the first cache memory device has a faster access time and a smaller capacity than the second cache memory device. The method also comprises storing, by the location-based prefetcher circuit in a prefetcher array entry of a plurality of prefetcher array entries of a prefetcher array of the location-based prefetcher circuit associated with the first memory address as a trigger memory address of the prefetcher array entry, and a set indicator and a way indicator of the set and the way, respectively, of the second cache memory device as a target identifier of the prefetcher array entry.

In another exemplary embodiment, a non-transitory computer-readable medium having stored thereon computer-executable instructions is provided. The computer-executable instructions, when executed by a processor, cause the processor to provide location-based prefetching for a first cache memory device by causing the processor to identify an association between a first memory address of a first memory access request and a second memory address of a subsequent second memory access request. The computer-executable instructions further cause the processor to determine a set and a way of a second cache memory device in which data corresponding to the second memory address is stored, wherein the first cache memory device has a faster access time and a smaller capacity than the second cache memory device. The computer-executable instructions also cause the processor to store, in a prefetcher array entry of a plurality of prefetcher array entries of a prefetcher array of a location-based prefetcher circuit, the first memory address as a trigger memory address of the prefetcher array entry, and a set indicator and a way indicator of the set and the way, respectively, of the second cache memory device as a target identifier of the prefetcher array entry.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

Figure 2:
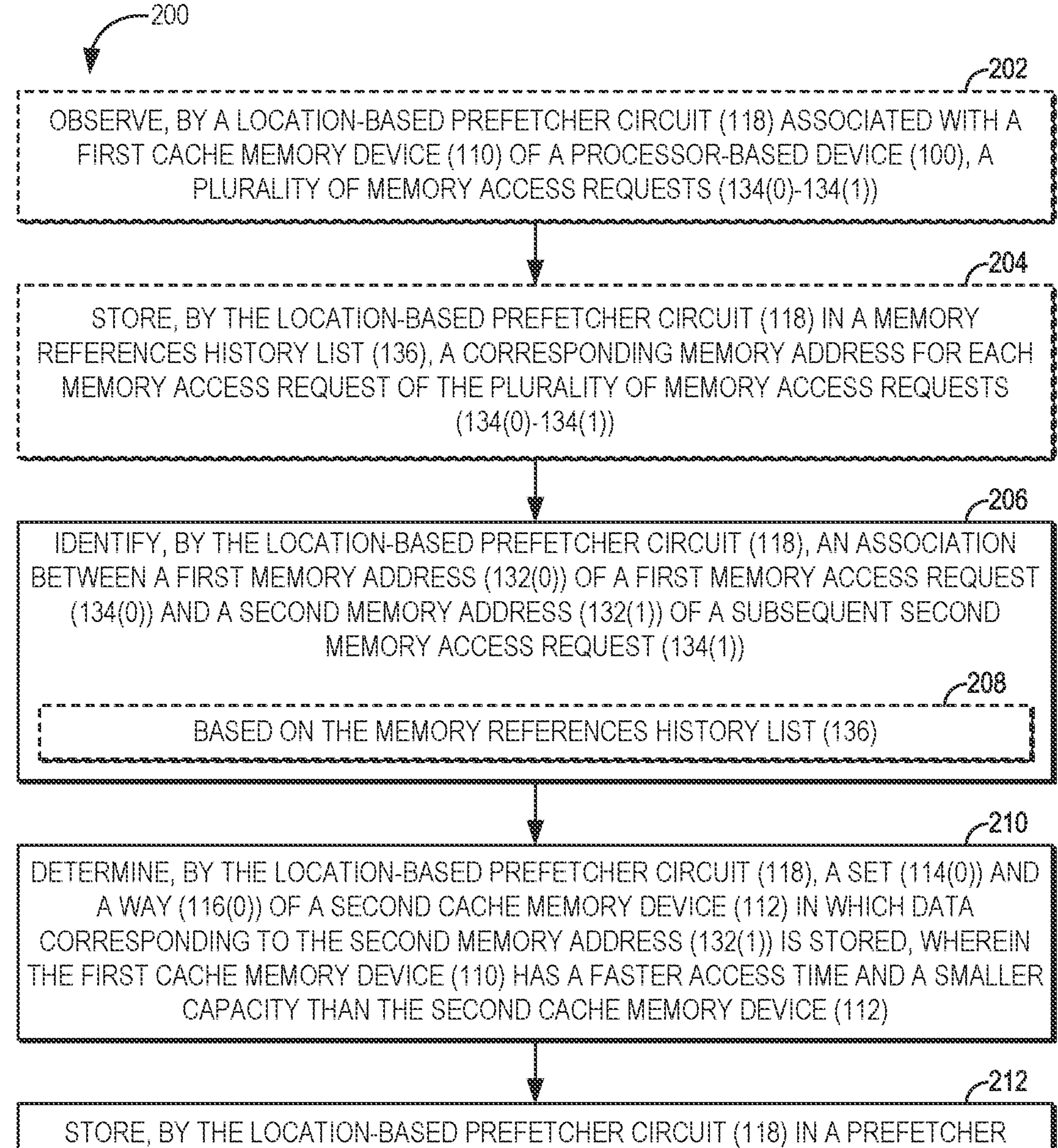
Figure 3A:
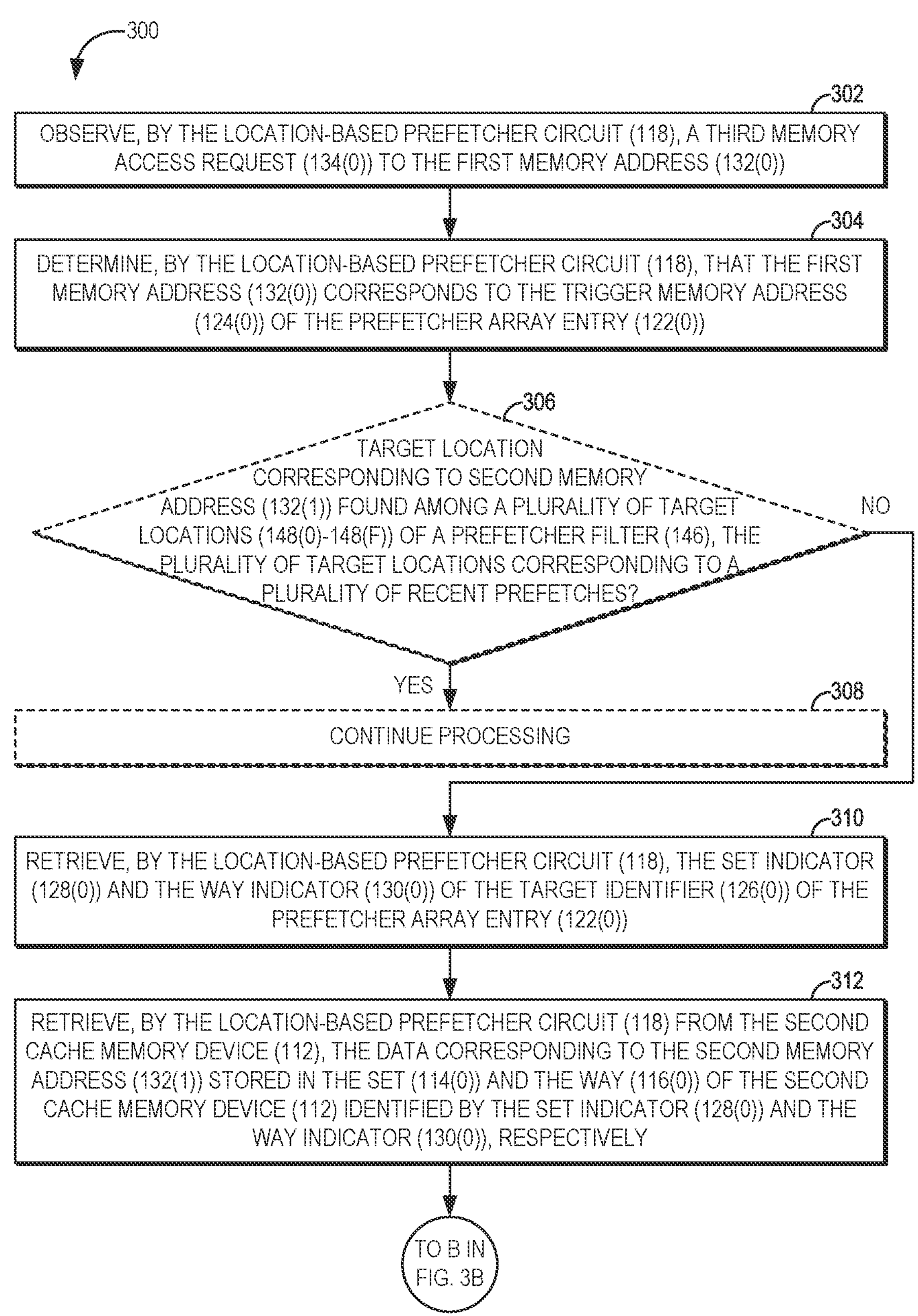
Figure 3B:
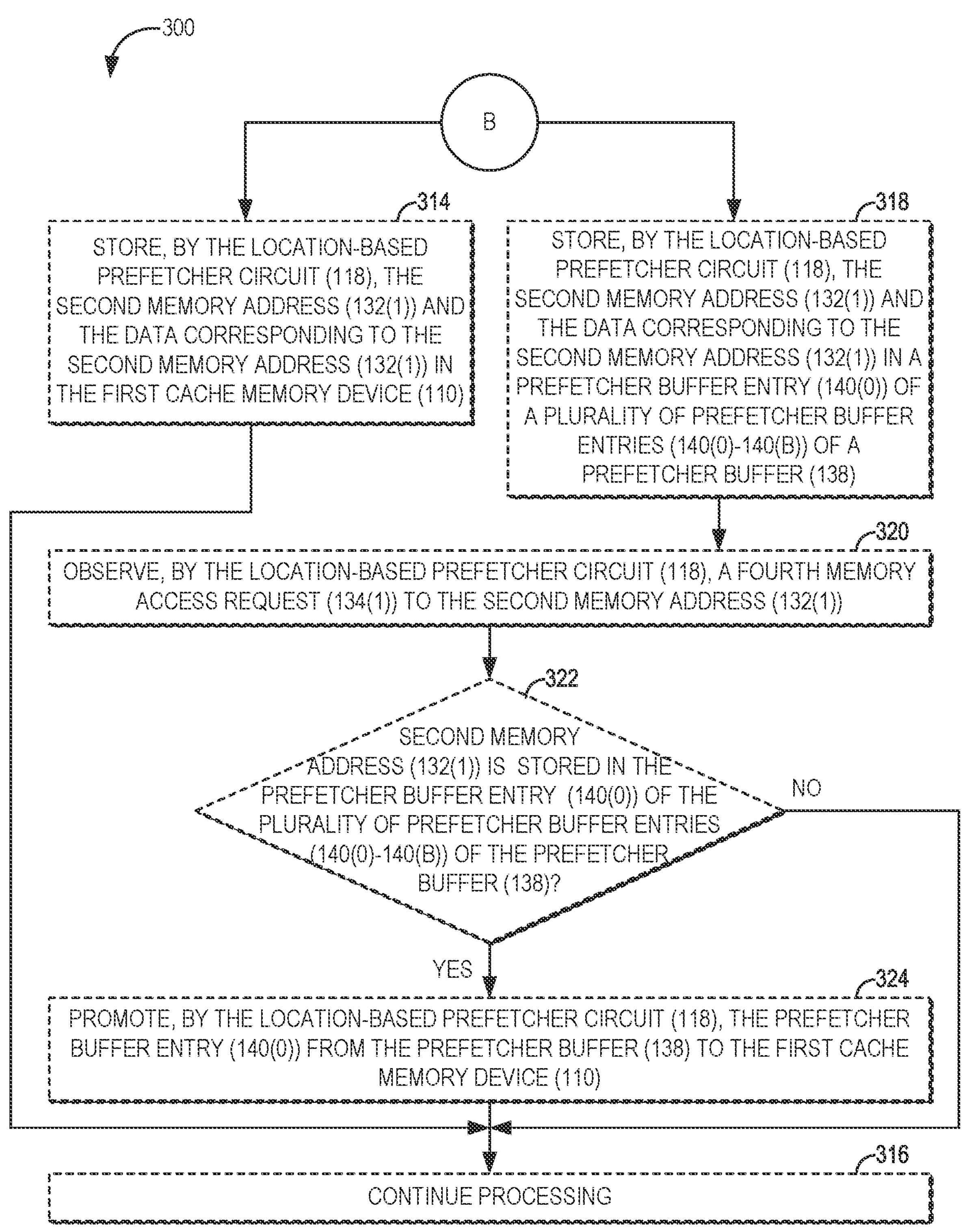
Figure 4:
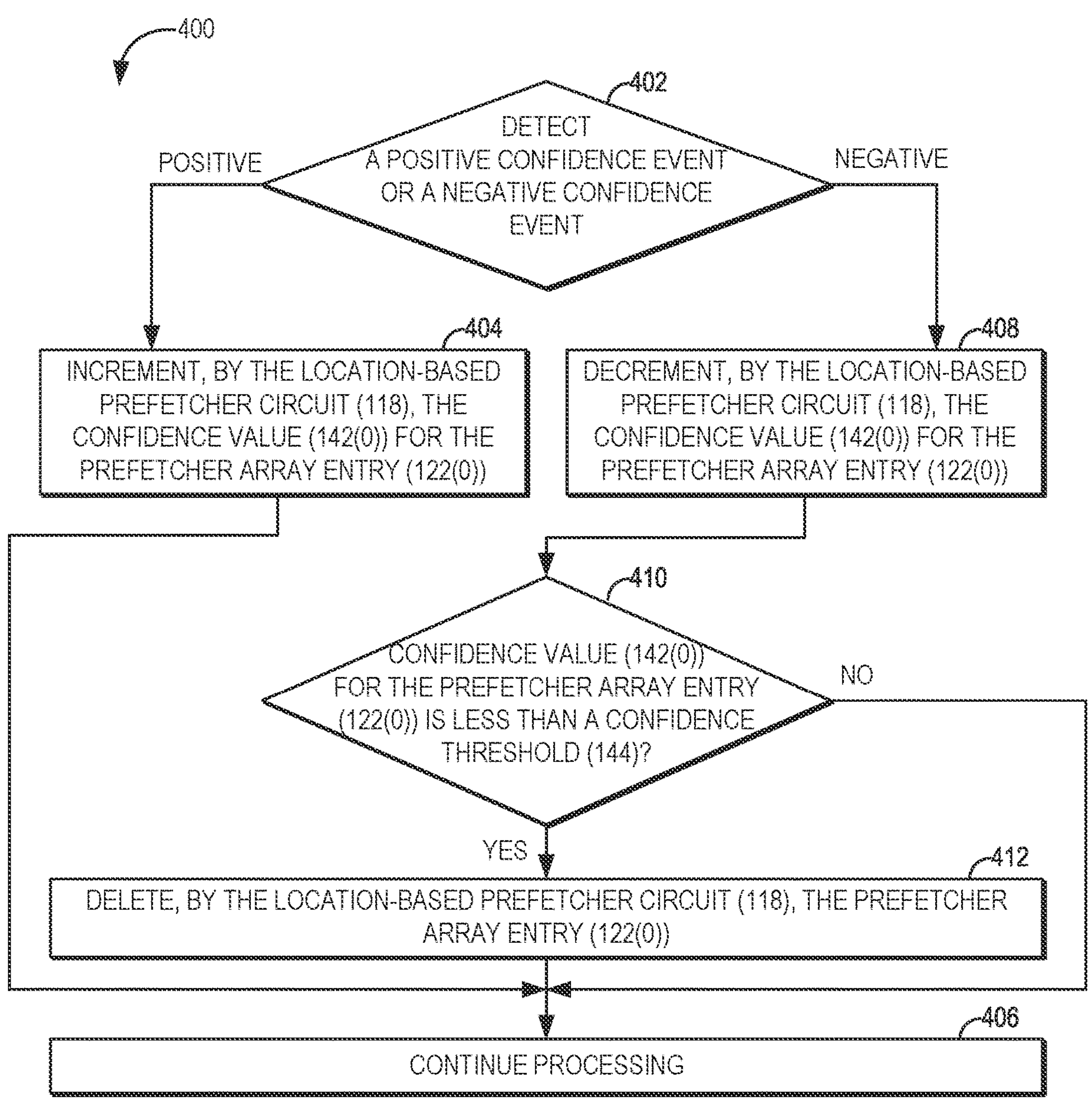
Figure 5:
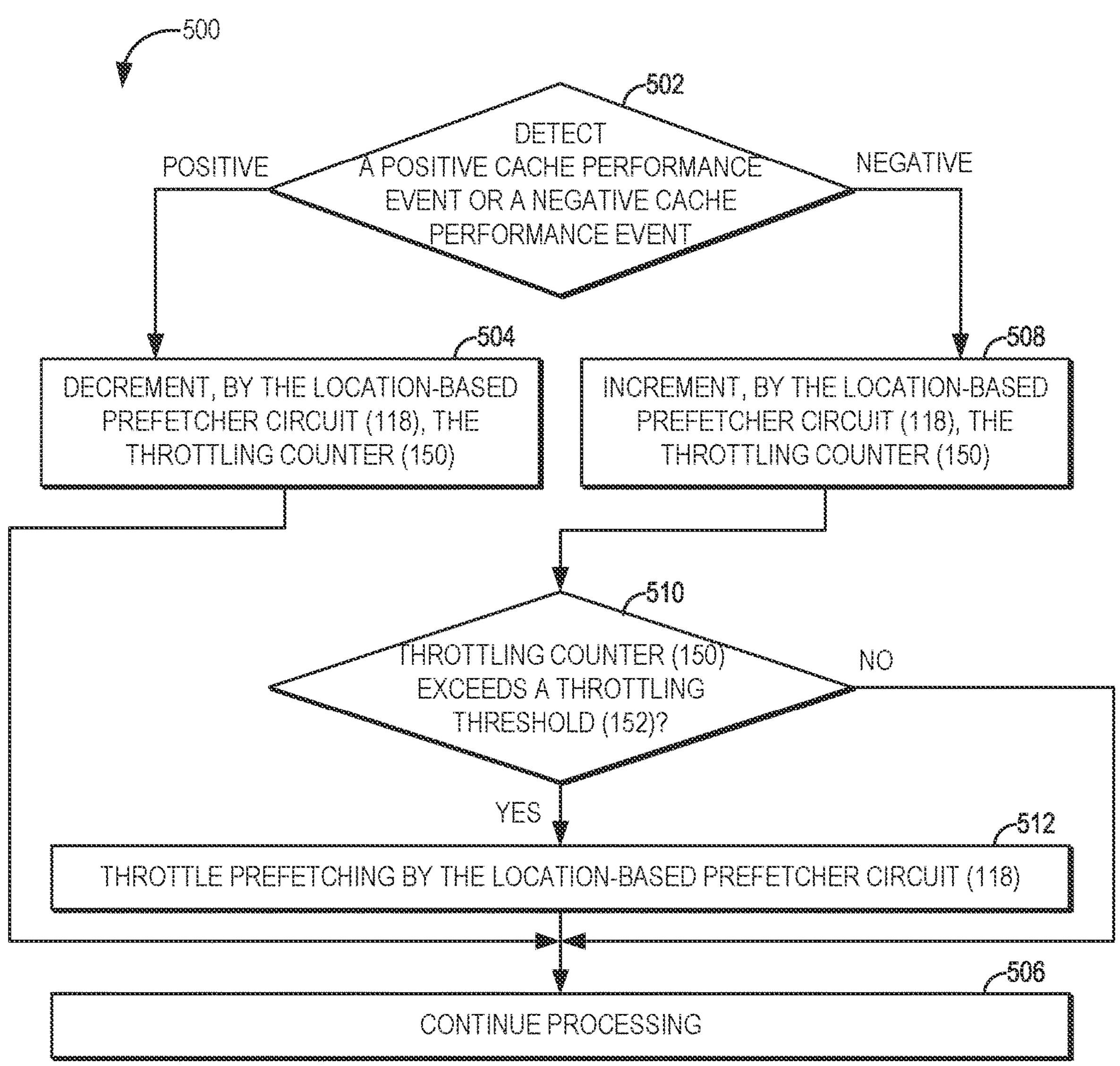
Figure 6:
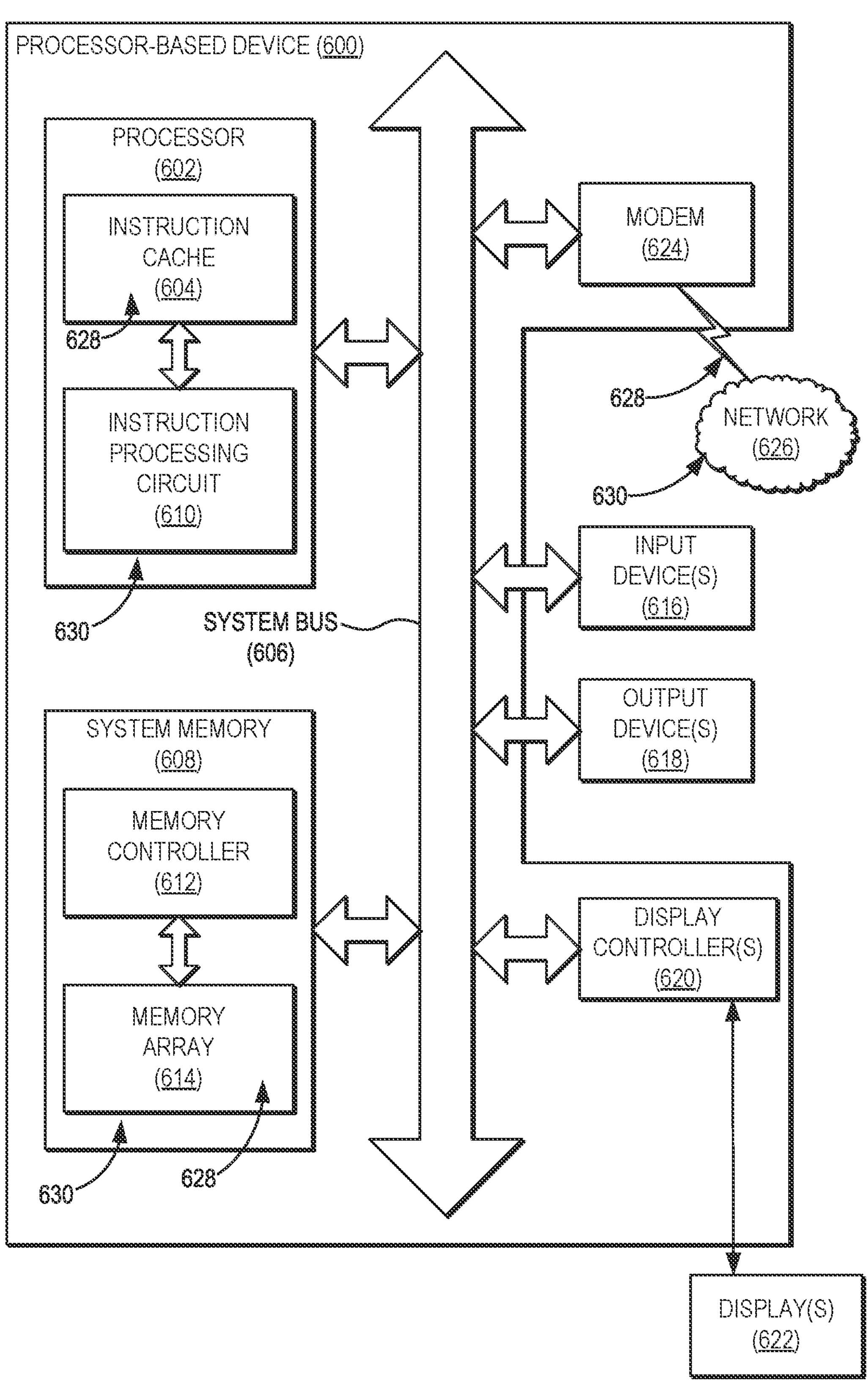

FIG. 1 is a block diagram illustrating an exemplary processor-based device including a location-based prefetcher circuit that is configured to provide location-based prefetching;

FIG. 2 provides a flowchart illustrating exemplary operations of the processor-based device of FIG. 1 for providing location-based prefetching, according to some embodiments;

FIGS. 3A and 3B provide a flowchart illustrating further exemplary operations of the processor-based device of FIG. 1 for retrieving data from a cache using location data stored in a prefetcher array of the location-based prefetcher circuit of FIG. 1, according to some embodiments;

FIG. 4 provides a flowchart illustrating exemplary operations of the processor-based device of FIG. 1 for detecting positive and negative confidence events, and adjusting a confidence value of a prefetcher array entry of the prefetcher array of the location-based prefetcher circuit of FIG. 1, according to some embodiments;

FIG. 5 provides a flowchart illustrating exemplary operations of the processor-based device of FIG. 1 for detecting positive and negative cache performance events, and adjusting a throttling counter of the location-based prefetcher circuit of FIG. 1, according to some embodiments; and FIG. 6 is a block diagram of an exemplary processor-based device, such as the processor-based device of FIG. 1, that is configured to provide location-based prefetching, according to some embodiments.

DETAILED DESCRIPTION

Exemplary embodiments disclosed herein include providing location-based prefetching in processor-based devices. In this regard, in one exemplary embodiment, a processor-based device provides a location-based prefetcher circuit. As used herein, "location-based" refers to the location-based prefetcher circuit being configured to store a location of the data corresponding to a target memory address in a next-higher-level cache, instead of storing all or part of the target memory address itself. Accordingly, the location-based prefetcher circuit comprises a prefetcher array that stores a plurality of prefetcher array entries. Each of the prefetcher array entries stores a trigger memory address and a target identifier that comprises a set indicator and a way indicator representing a set and a way, respectively, of a next-higher-level cache in which data corresponding to the target memory address is stored. The location-based prefetcher circuit is associated with a first cache memory device that has a faster access time and a smaller capacity than a second cache memory device (i.e., the next-higher-level cache).

In exemplary operation, the location-based prefetcher circuit populates the prefetcher array by first identifying an association between a first memory address of a first memory access request and a second memory address of a subsequent second memory access request. The location-based prefetcher circuit next determines a set and a way of the second cache memory device in which data (e.g., a cache line) corresponding to the second memory address is stored. Some embodiments may provide that the set and the way are determined by the location-based prefetcher circuit based on location information provided by the second cache memory device when providing prefetched data. The location-based prefetcher circuit then stores the first memory address as the trigger memory address of a prefetcher array entry, and also stores a set indicator and a way indicator of the set and the way, respectively, of the second cache memory device as the target identifier of the prefetcher array entry. In some embodiments, the set indicator of each target identifier may comprise a number N of bits, wherein N is the binary logarithm of a count of sets of the second cache memory device, while the way indicator of each target identifier may comprise a number W of bits, wherein W is the binary logarithm of a count of ways of the second cache memory device.

Because each prefetcher array entry stores the set indicator and the way indicator instead of the target memory address, each prefetcher array entries requires fewer bits of data. This enables the location-based prefetcher have a larger capacity than conventional prefetchers while occupying the same area and consuming the same amount of power, or to have the same capacity as conventional prefetchers while occupying a smaller area and consuming less power. Moreover, embodiments of the location-based prefetcher circuit disclosed herein can achieve greater energy efficiency and can apply the approach described herein to any multi-level cache or data structure.

Some embodiments of the location-based prefetcher circuit may provide additional data structures to further improve performance. For example, in some embodiments, the location-based prefetcher circuit may provide a memory references history list, in which a plurality of memory addresses corresponding to observed memory access requests are stored. The location-based prefetcher circuit may populate the memory references history list as memory access requests are observed and may subsequently use the memory references history list to identify an association between a trigger memory address and a target memory address.

Some embodiments may further provide that the location-based prefetcher circuit may perform prefetching by first observing a subsequent memory access request to the first memory address, and then determining that the first memory address corresponds to the trigger memory address of a prefetcher array entry. The location-based prefetcher uses the set indicator and the way indicator of the target identifier of the prefetcher array entry to prefetch data by retrieving the data stored in the set and the way of the second cache memory device identified by the set indicator and the way indicator, respectively. The retrieved data in some embodiments may be stored in a prefetcher buffer entry of a prefetcher buffer of the location-based prefetcher circuit. In such embodiments, when the location-based prefetcher circuit observes a subsequent memory access request to the second memory address, the location-based prefetcher circuit may promote the prefetcher buffer entry storing the retrieved data from the prefetcher buffer to the first cache memory device.

In some embodiments, each prefetcher array entry of the prefetcher array may further include a confidence value that is incremented or decremented when the location-based prefetcher observes positive or negative confidence events, respectively, associated with the target memory address corresponding to the prefetcher array entry. If the confidence value for a prefetcher array entry falls below a confidence threshold, the location-based prefetcher circuit in such embodiments may delete the prefetcher array entry. Some embodiments of the location-based prefetcher circuit may also comprise a prefetcher filter that tracks target locations of recent prefetches (e.g., a set indicator and a way indicator for each recent prefetch). Before retrieving data from the second cache memory device, the location-based prefetcher circuit consults the prefetcher filter to see if a target location corresponding to the target memory address is stored therein, and only performs the data retrieval if the target location corresponding to the target memory address is not found in the prefetcher filter.

According to some embodiments, the location-based prefetcher circuit further provides a throttling counter that is incremented or decremented when the location-based prefetcher circuit observes events indicating negative cache performance or positive cache performance, respectively. If the throttling counter exceeds a throttling threshold, the location-based prefetcher circuit in such embodiments may throttle prefetching (e.g., by suspending prefetching operations of the location-based prefetcher circuit for a specified time interval).

In this regard, FIG. 1 illustrates an exemplary processor-based device 100 that provides a processor 102 for providing location-based prefetching. The processor 102 in some aspects may comprise a central processing unit (CPU) having one or more processor cores, and in some exemplary aspects may be one of a plurality of similarly configured processors (not shown) of the processor-based device 100. The processor 102 is communicatively coupled to an interconnect bus 104, which in some embodiments may include additional constituent elements (e.g., a bus controller circuit and/or an arbitration circuit, as non-limiting examples) that are not shown in FIG. 1 for the sake of clarity. The processor 102 is also communicatively coupled, via the interconnect bus 104, to a memory controller 106 that controls access to a system memory 108 and manages the flow of data to and from the system memory 108. The system memory 108 provides addressable memory used for data storage by the processor-based device 100, and as such may comprise synchronous dynamic random access memory (SDRAM), as a non-limiting example.

The processor 102 of FIG. 1 further includes a memory hierarchy that comprises a cache memory device 110 and a cache memory device 112. In the example of FIG. 1, the cache memory device 110 comprises a first-level cache that has a faster access speed and a smaller capacity than the cache memory device 112, which represents a next-higher-level cache. The cache memory device 110 and the cache memory device 112 each may be used to cache local copies of frequently accessed data within the processor 102 for quicker access (e.g., by a memory access stage of an execution pipeline (not shown) of the processor 102).

Each of the cache memory device 110 and the cache memory device 112 provides a plurality of cache lines (not shown) for storing frequently access data retrieved from the system memory 108. As seen in FIG. 1, the cache memory device 112 is organized into a plurality of sets 114(0)-114(S), each of which includes a plurality of ways 116(0)-116(W), 116'(0)-116'(W) in which a cache line may be stored. Thus, in embodiments in which the cache memory device 112 has a capacity of 32 kilobytes (32K) and stores cache lines having a size of 64 bytes, the cache memory device 112 may be organized into 64 sets of eight (8) ways each. It is to be understood that, while not shown in FIG. 1, the cache memory device 110 may be organized into a plurality of sets and a plurality of ways in a manner similar to that shown for the cache memory device 112.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include more or fewer elements than illustrated in FIG. 1. For example, the processor 102 may further include one or more functional units, instruction caches, unified caches, memory controllers, interconnect buses, and/or additional memory devices, caches, and/or controller circuits, which are omitted from FIG. 1 for the sake of clarity.

As noted above, when a memory access request is received, the cache memory device 110 is queried first to determine whether the requested data is stored therein. If not, the memory access request is forwarded to the cache memory device 112 (and possibly on to the system memory 108), which may result in increased memory access latency. A conventional processor may mitigate this scenario using a prefetcher that may attempt to fetch data from the cache memory device 112 and place it into a cache memory device 110 before the data is actually requested by the processor 102. Such a prefetcher tracks memory access patterns to identify correlations between a trigger memory address and a target memory address, which is stored using a corresponding full or partial cache-line address for the target memory address. While this approach results in increased accuracy, conventional prefetchers require significant storage space for the target memory addresses.

In this regard, the processor-based device 100 of FIG. 1 provides a location-based prefetcher circuit 118 that is configured to provide location-based prefetching. The location-based prefetcher circuit 118 is considered to be "location-based" insofar as it is configured to store a location of the data corresponding to a target memory address in a next-higher-level cache such as the cache memory device 112, instead of storing all or part of the target memory address itself. Accordingly, the location-based prefetcher circuit 118 comprises a prefetcher array 120 that includes a plurality of prefetcher array entries (captioned as "PREF ARRAY ENTRY" in FIG. 1) 122(0)-122(P). As seen in FIG. 1, the prefetcher array entry 122(0) stores a trigger memory address (captioned as "TRIGGER MEM ADDR" in FIG. 1) 124(0) that is used to reference the prefetcher array entry 122(0), along with a target identifier (captioned as "TARGET" in FIG. 1) 126(0). The target identifier 126(0) comprises a set indicator (captioned as "SET" in FIG. 1) 128(0) and a way indicator (captioned as "WAY" in FIG. 1) 130(0) that represent one of the sets 114(0)-114(S) and one of the ways 116(0)-116(W), 116'(0)-116'(W), respectively, of the cache memory device 112 in which data corresponding to a target memory address is stored. Although not shown in FIG. 1 for the sake of clarity, it is to be understood that each of the prefetcher array entries 122(0)-122(P) include trigger memory addresses and target identifiers that correspond to the trigger memory address 124(0) and the target identifier 126(0) of the prefetcher array entry 122(0). Moreover, while FIG. 1 shows that the location-based prefetcher circuit 118 is associated with the cache memory device 110 and is configured to prefetch data from the cache memory device 112, it is to be understood that some embodiments may comprise location-based prefetcher circuits (not shown) that operate in a similar fashion for other levels of the memory hierarchy shown in FIG. 1.

By using location-based prefetching, the location-based prefetcher circuit 118 can reduce the storage costs associated with conventional prefetchers while offering comparable performance. For example, a conventional prefetcher that operates in a system that uses 46-bit virtual memory addresses and a cache line size of 64 bytes, and that prefetches cache lines from an eight-way, 32-kilobyte cache memory device, would require 40 bits (i.e., 46 (the virtual memory address size in bits) minus 6 (the binary logarithm of the cache line size)) to store a target memory address. However, by storing the location of the data associated with the target memory in the cache memory device, the location-based prefetcher circuit 118 in the same scenario would require a total of only nine (9) bits: the set indicator 128(0) would require six (6) bits (i.e., the binary logarithm of 64, the number of sets in the cache memory device), while the way indicator 130(0) would require three (3) bits (i.e., the binary logarithm of eight (8), the number of ways in the cache memory device).

In exemplary operation, the location-based prefetcher circuit 118 of FIG. 1 populates the prefetcher array 120 by first identifying an association between a first memory address (captioned as "MEM ADDR" in FIG. 1) 132(0) of a first memory access request (captioned as "MEM ACC REQ" in FIG. 1) 134(0) and a second memory address (captioned as "MEM ADDR" in FIG. 1) 132(1) of a subsequent second memory access request (captioned as "MEM ACC REQ" in FIG. 1) 134(1). In some embodiments, this association is identified by the location-based prefetcher circuit 118 using a memory references history list (captioned as "MEMORY REF HISTORY LIST" in FIG. 1) 136, in which a plurality of memory addresses (not shown) corresponding to recently observed memory access requests such as the memory access requests 134(0) and 134(1) are stored. The location-based prefetcher circuit 118 may populate the memory references history list 136 with memory addresses as the corresponding memory access requests are observed and may subsequently use the memory references history list 136 to identify an association between a trigger memory address (e.g., the memory address 132(0) of FIG. 1) and a target memory address (e.g., the memory address 132(1) of FIG. 1). For example, the memory references history list 136 may be configured to store a specified number of the most recently requested memory addresses and may identify a trigger memory address and its corresponding target memory address as memory addresses that are separated by a given correlation distance in the memory references history list 136.

The location-based prefetcher circuit 118 next determines a set (e.g., the set 114(0)) and a way (e.g., the way 116(0)) of the cache memory device 112 in which data corresponding to the memory address 132(1) is stored. The location-based prefetcher circuit 110 in some embodiments may determine the set 114(0) and the way 116(0) based on location information (not shown) provided by the cache memory device 112 (e.g., when providing prefetched data to the location-based prefetcher circuit 118). The location-based prefetcher circuit 118 stores the memory address 132(0) as the trigger memory address 124(0) of a prefetcher array entry such as the prefetcher array entry 122(0), and also stores the set indicator 128(0) and the way indicator 130(0) of the set 114(0) and the way 116(0), respectively, of the cache memory device 112 as the target identifier 126(0) of the prefetcher array entry 122(0). As noted above, some embodiments may provide that the set indicator 128(0) of the target identifier 126(0) may comprise a number N of bits, wherein N is the binary logarithm of a count S of the sets 114(0)-114(S) of the cache memory device 112, while the way indicator 130(0) of the target identifier 126(0) may comprise a number W of bits, wherein W is the binary logarithm of a count W of ways 116(0)-116(W), 116'(0)-116'(W) of the cache memory device 112.

It is to be understood that while FIG. 1 illustrates the trigger memory address 124(0) being associated with a single target identifier 126(0), some embodiments may provide that the trigger memory address 124(0) may be associated with multiple target identifiers. Such embodiments having multiple target identifiers associated with a single trigger memory address enable handling of more complex control access patterns.

In some embodiments, the location-based prefetcher circuit 118 performs prefetching by first observing a subsequent memory access request to the memory address 132(0), such as a later occurrence of the memory access request 134(0). The location-based prefetcher circuit 118 next determines that the memory address 132(0) corresponds to the trigger memory address 124(0) of the prefetcher array entry 122(0). The location-based prefetcher circuit 118 then uses the set indicator 128(0) and the way indicator 130(0) of the target identifier 126(0) of the prefetcher array entry 122(0) to prefetch data by retrieving the data stored in the set 114(0) and the way 116(0) of the cache memory device 112 identified by the set indicator 128(0) and the way indicator 130(0), respectively.

In some embodiments, the retrieved data may be stored directly into the cache memory device 110. However, to avoid polluting the cache memory device 110 with the prefetched data, the location-based prefetcher circuit 118 in some embodiments may provide a prefetcher buffer 138 that stores prefetched data, and the corresponding target memory address fetched therewith, in one of a plurality of prefetcher buffer entries (captioned as "BUF" in FIG. 1) 140(0)-140(B). Some embodiments may provide that the prefetcher buffer entries 140(0)-140(B) may also store additional metadata (not shown) for the corresponding prefetched data, such as a pointer to a corresponding prefetcher array entry 122(0)-122(P) of the prefetcher array 120. In such embodiments, the target memory address 132(1) and the retrieved data are stored in a prefetcher buffer entry such as the prefetcher buffer entry 140(0). When the location-based prefetcher circuit 118 later observes a subsequent memory access request to the target memory address 132(1) (e.g., a later occurrence of the memory access request 134(1)) that results in a hit on the prefetcher buffer 138, the location-based prefetcher circuit 118 may promote the prefetcher buffer entry 140(0) that stores the retrieved data from the prefetcher buffer 138 to the cache memory device 110. Some embodiments may provide that when the prefetcher buffer 138 is full, the location-based prefetcher circuit 118 may use an aging mechanism, operating in a First-In-First-Out (FIFO) manner, to replace old prefetched data that has never been promoted with newly prefetched data.

According to some embodiments, the prefetcher array entries 122(0)-122(P) of the prefetcher array 120 may further include a confidence value, such as the confidence value (captioned as "CONF VALUE" in FIG. 1) 142(0) of the prefetcher array entry 122(0), to provide feedback on the confidence in the corresponding target identifier 126(0) stored in the prefetcher array 120. The location-based prefetcher circuit 118 in such embodiments may increment or decrement the confidence value 142(0) when the location-based prefetcher circuit 118 observes a positive confidence event or a negative confidence event, respectively. A positive confidence event may comprise, as a non-limiting example, a promotion of a corresponding prefetcher buffer entry such as the prefetcher buffer entry 140(0) to the cache memory device 110. A negative confidence event may comprise, as non-limiting examples, removal of the prefetcher buffer entry 140(0) from the prefetcher buffer 138 without promotion to the cache memory device 110, or a memory access request hit on both the cache memory device 110 and the prefetcher buffer 138. To link a positive confidence or a negative confidence event with the prefetcher array entries 122(0)-122(P), the location-based prefetcher circuit 118 may employ metadata stored in the prefetcher buffer entries 140(0)-140(B) of the prefetcher buffer 138, such as pointers associating the prefetcher buffer entries 140(0)-140(B) with corresponding prefetcher array entries 122(0)-122(P). The location-based prefetcher circuit 118 in such embodiments is further configured to determine whether the confidence value 142(0) for the prefetcher array entry 122(0) falls below a confidence threshold 144. If so, the location-based prefetcher circuit 118 deletes the prefetcher array entry 122(0) from the prefetcher array 120.

To avoid needless generation of prefetches, the location-based prefetcher circuit 118 in some embodiments may also comprise a prefetcher filter 146 that that tracks target locations (captioned as "LOC" in FIG. 1) 148(0)-148(F) of recent prefetches (i.e., a set indicator and a way indicator for each prefetch). Such embodiments provide that the location-based prefetcher circuit 118 populates the prefetcher filter 146 with target locations whenever a prefetch is performed. Later, before prefetching data from the cache memory device 112, the location-based prefetcher circuit 118 first determines whether the target location (e.g., a target location corresponding to the memory address 132(1)) is stored therein. The location-based prefetcher circuit 118 is configured to perform the data retrieval only if target location corresponding to the memory address 132(1) is not found in the prefetcher filter 146.

Some embodiments of the location-based prefetcher circuit 118 may provide a throttling mechanism to track its own performance, and to throttle prefetching (e.g., by suspending prefetching operations for a specified period of time) if performance declines. Thus, in such embodiments, the location-based prefetcher circuit 118 provides a throttling counter 150 that is decremented or incremented when the location-based prefetcher circuit 118 observes a positive cache performance event or a negative cache performance event, respectively. A positive cache performance event may comprise, as non-limiting examples, a promotion from the prefetcher buffer 138 to the cache memory device 110, or a memory access miss on both the cache memory device 110 and the prefetcher buffer 138. A negative cache performance event may comprise, as non-limiting examples, a deletion without promotion from the prefetcher buffer 138, a memory access request hit on both the cache memory device 110 and the prefetcher buffer 138, or a memory access request hit on the prefetcher filter 146. The location-based prefetcher circuit 118 in such embodiments is further configured to determine whether the throttling counter 150 exceeds a throttling threshold 152. If so, the location-based prefetcher circuit 118 may throttle prefetching.

To illustrate exemplary operations of the processor-based device 100 of FIG. 1 for providing location-based prefetching according to some embodiments, FIG. 2 provides a flowchart illustrating exemplary operations 200. For the sake of clarity, elements of FIG. 1 are referenced in describing FIG. 2. It is to be understood that some of the exemplary operations 200 illustrated in FIG. 2 may be performed in an order other than that illustrated herein or may be omitted. In some embodiments, the exemplary operations 200 may begin with a location-based prefetcher circuit, such as the location-based prefetcher circuit 118 of FIG. 1, associated with a first cache memory device of a processor-based device (e.g., the cache memory device 110 of the processor-based device 100 of FIG. 1), observing a plurality of memory requests (e.g., the memory access requests 134(0)-134(1) of FIG. 1) (block 202). The location-based prefetcher circuit 118 in such embodiments then stores, in a memory references history list (e.g., the memory references history list 136 of FIG. 1), a corresponding memory address for each memory access request of the plurality of memory access requests 134(0)-134(1) (block 204).

The location-based prefetcher circuit 118 identifies an association between a first memory address of a first memory access request and a second memory address of a subsequent second memory access request (e.g., the memory address 132(0) of the memory access request 134(0) and the memory address 132(1) of the memory access request 134(1), respectively, of FIG. 1) (block 206). In some embodiments, the operations of block 206 for identifying the association between the first memory address 132(0) of the first memory access request 134(0) and the second memory address 132(1) of the subsequent second memory access request 134(1) are based on the memory references history list 136 (block 208).

The location-based prefetcher circuit 118 then determines a set and a way (e.g., the set 114(0) and the way 116(0), respectively, of FIG. 1) of a second cache memory device (e.g., the cache memory device 112 of FIG. 1) in which data corresponding to the second memory address 132(1) is stored, wherein the first cache memory device 110 has a faster access time and a smaller capacity than the second cache memory device 112 (block 210). The location-based prefetcher circuit 118 then stores, in a prefetcher array entry of a plurality of prefetcher array entries of a prefetcher array (e.g., the prefetcher array entry 122(0) of the prefetcher array entries 122(0)-122(P) of the prefetcher array 120 of FIG. 1), the first memory address 132(0) as a trigger memory address (e.g., the trigger memory address 124(0) of FIG. 1) of the prefetcher array entry 122(0), and a set indicator and a way indicator (e.g., the set indicator 128(0) and a way indicator 130(0) of FIG. 1) of the set 114(0) and the way 116(0), respectively, of the second cache memory device 112 as a target identifier (e.g., the target identifier 126(0) of FIG. 1) of the prefetcher array entry 122(0) (block 212).

FIGS. 3A and 3B provide a flowchart that illustrates further exemplary operations 300 of the processor-based device 100 of FIG. 1 for retrieving data from a cache memory device using location data stored in the prefetcher array 120 of the location-based prefetcher circuit 118 of FIG. 1, according to some embodiments. Elements of FIG. 1 are referenced in describing FIGS. 3A and 3B for the sake of clarity. It is to be understood that some of the exemplary operations 300 illustrated in FIGS. 3A and 3B may be performed in an order other than that illustrated herein or may be omitted. The exemplary operations 300 begin in FIG. 3A with the location-based prefetcher circuit 118 observing a third memory access request to the first memory address 132(0) (e.g., a subsequent occurrence of the memory access request 134(0) of FIG. 1) (block 302). The location-based prefetcher circuit 118 determines that the first memory address 132(0) corresponds to the trigger memory address 124(0) of the prefetcher array entry 122(0) (block 304). In embodiments of the location-based prefetcher circuit 118 that provide a prefetcher filter such as the prefetcher filter 146 of FIG. 1, the location-based prefetcher circuit 118 determines whether a target location corresponding to the second memory address 132(1) is found among a plurality of target locations of a prefetcher filter (e.g., the plurality of target locations 148(0)-148(F) of the prefetcher filter 146 of FIG. 1), wherein the plurality of target locations corresponds to a plurality of recent prefetches (block 306). If so, then a prefetch has recently been performed for the data at the second memory address 132(1), and thus another prefetch is not necessary. Accordingly, processing continues in conventional fashion (block 308).

If the location-based prefetcher circuit 118 determines at decision block 306 that a target location corresponding to the second memory address 132(1) is not found among the plurality of target locations 148(0)-148(F) of the prefetcher filter 146, then the location-based prefetcher circuit 118 retrieves the set indicator 128(0) and the way indicator 130(0) of the target identifier 126(0) of the prefetcher array entry 122(0) (i.e., the prefetcher array entry that stores the first memory address 132(0) as the trigger memory address 124(0)) (block 310). The location-based prefetcher circuit 118 then retrieves, from the second cache memory device 112, the data corresponding to the second memory address 132(1) stored in the set 114(0) and the way 116(0) of the second cache memory device 112 identified by the set indicator 128(0) and the way indicator 130(0), respectively (block 312). The exemplary operations 300 in some embodiments continue at block 314 or 318 of FIG. 3B.

Referring now to FIG. 3B, in some embodiments, the location-based prefetcher circuit 118 stores the second memory address 132(1) and the data corresponding to the second memory address 132(1) in the first cache memory device 110 (block 314). Processing then continues in conventional fashion (block 316). Some embodiments may provide that, instead of storing the second memory address 132(1) and the corresponding data in the first cache memory device 110, the location-based prefetcher circuit 118 instead stores the second memory address 132(1) and the data corresponding to the second memory address 132(1) in a prefetcher buffer entry of a plurality of prefetcher buffer entries of a prefetcher buffer (e.g., the prefetcher buffer entry 140(0) of the plurality of prefetcher buffer entries 140(0)-140(B) of the prefetcher buffer 138 of FIG. 1) (block 318). In such embodiments, the location-based prefetcher circuit 118 may then subsequently observe a fourth memory access request to the second memory address 132(1) (e.g., a subsequent occurrence of the memory access request 134(1) of FIG. 1) (block 320). The location-based prefetcher circuit 118 determines whether the second memory address 132(1) is stored in the prefetcher buffer entry 140(0) of the plurality of prefetcher buffer entries 140(0)-140(B) of the prefetcher buffer 138 (block 322). If not, processing continues in conventional fashion (block 316). However, if the location-based prefetcher circuit 118 determines that the second memory address 132(1) is stored in the prefetcher buffer entry 140(0), the location-based prefetcher circuit 118 promotes the prefetcher buffer entry 140(0) from the prefetcher buffer 138 to the first cache memory device 110 (block 324). Processing then continues in conventional fashion at block 316.

To illustrate exemplary operations of the processor-based device 100 of FIG. 1 for detecting positive and negative confidence events and adjusting confidence values in response according to some embodiments, FIG. 4 provides a flowchart illustrating exemplary operations 400. For the sake of clarity, elements of FIG. 1 are referenced in describing FIG. 4. In FIG. 4, the exemplary operations 400 begin with the location-based prefetcher circuit 118 detecting a positive confidence event or a negative confidence event (block 402). As described above, a positive confidence event may comprise a promotion of one of the prefetcher buffer entries 140(0)-140(B) from the prefetcher buffer 138 to the cache memory device 110, while a negative confidence event may comprise one of removal of one of the prefetcher buffer entries 140(0)-140(B) from the prefetcher buffer 138 without promotion, or a memory access request hit on both the cache memory device 110 and the prefetcher buffer 138.

If the location-based prefetcher circuit 118 detects a positive confidence event, the location-based prefetcher circuit 118 increments the confidence value for the corresponding prefetcher array entry (e.g., the confidence value 142(0) for the prefetcher array entry 122(0) of FIG. 1) (block 404). Processing then continues in conventional fashion (block 406). If the location-based prefetcher circuit 118 detects a negative confidence event, the location-based prefetcher circuit 118 decrements the confidence value 142(0) for the prefetcher array entry 122(0) (block 408). The location-based prefetcher circuit 118 then determines whether the confidence value 142(0) for the prefetcher array entry 122(0) is less than a confidence threshold, such as the confidence threshold 144 of FIG. 1 (block 410). If not, processing continues in conventional fashion (block 406). However, if the location-based prefetcher circuit 118 determines at decision block 410 that the confidence value 142(0) for the prefetcher array entry 122(0) is less than the confidence threshold 144, the location-based prefetcher circuit 118 deletes the prefetcher array entry 122(0) (block 412). Processing then continues in conventional fashion (block 406).

FIG. 5 provides a flowchart illustrating exemplary operations 500 of the processor-based device 100 of FIG. 1 for detecting positive and negative cache performance events, and, in response, adjusting a throttling counter of the location-based prefetcher circuit 118 of FIG. 1, according to some embodiments. Elements of FIG. 1 are referenced in describing FIG. 5 for the sake of clarity. The exemplary operation 500 begin with the location-based prefetcher circuit 118 detecting a positive cache performance event or a negative cache performance event (block 502). According to some embodiments, a positive cache performance event may comprise one of a promotion from the prefetcher buffer 138 to the cache memory device 110 or a memory access request miss on both the cache memory device 110 and the prefetcher buffer 138. A negative cache performance event may comprise one of a deletion without promotion from the prefetcher buffer 138, a memory access request hit on both the cache memory device 110 and the prefetcher buffer 138, or a memory access request hit on the prefetcher filter 146.

If the location-based prefetcher circuit 118 detects a positive cache performance event, the location-based prefetcher circuit 118 decrements a throttling counter such as the throttling counter 150 of FIG. 1 (block 504). Processing then continues in conventional fashion (block 506). If the location-based prefetcher circuit 118 detects a negative cache performance event, the location-based prefetcher circuit 118 increments the throttling counter 150 (block 508). The location-based prefetcher circuit 118 then determines whether the throttling counter 150 exceeds a throttling threshold such as the throttling threshold 152 of FIG. 1 (block 510). If not, processing continues in conventional fashion (block 506). However, if the location-based prefetcher circuit 118 determines at decision block 510 that the throttling counter 150 exceeds the throttling threshold 152, the location-based prefetcher circuit 118 throttles prefetching by the location-based prefetcher circuit 118 (block 512). Processing then continues in conventional fashion (block 506).

FIG. 6 is a block diagram of an exemplary processor-based device 600, such as the processor-based device 100 of FIG. 1, that provides delivery of immediate values for program counter (PC)-relative load instructions using fetched literal data. The processor-based device 600 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 600 includes a processor 602. The processor 602 represents one or more general-purpose processing circuits, such as a microprocessor, central processing unit, or the like, and may correspond to the processor 102 of FIG. 1. The processor 602 is configured to execute processing logic in instructions for performing the operations and steps discussed herein. In this example, the processor 602 includes an instruction cache 604 for temporary, fast access memory storage of instructions and an instruction processing circuit 610. Fetched or prefetched instructions from a memory, such as from a system memory 608 over a system bus 606, are stored in the instruction cache 604. The instruction processing circuit 610 is configured to process instructions fetched into the instruction cache 604 and process the instructions for execution.

The processor 602 and the system memory 608 are coupled to the system bus 606 and can intercouple peripheral devices included in the processor-based device 600. As is well known, the processor 602 communicates with these other devices by exchanging address, control, and data information over the system bus 606. For example, the processor 602 can communicate bus transaction requests to a memory controller 612 in the system memory 608 as an example of a peripheral device. Although not illustrated in FIG. 6, multiple system buses 606 could be provided, wherein each system bus constitutes a different fabric. In this example, the memory controller 612 is configured to provide memory access requests to a memory array 614 in the system memory 608. The memory array 614 is comprised of an array of storage bit cells for storing data. The system memory 608 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 606. As illustrated in FIG. 6, these devices can include the system memory 608, one or more input device(s) 616, one or more output device(s) 618, a modem 624, and one or more display controller(s) 620, as examples. The input device(s) 616 can include any type of input device, including, but not limited to, input keys, switches, voice processors, etc. The output device(s) 618 can include any type of output device, including, but not limited to, audio, video, other visual indicators, etc. The modem 624 can be any device configured to allow exchange of data to and from a network 626. The network 626 can be any type of network, including, but not limited to, a wired or wireless network, a private or public network, a local area network (LAN), a wireless local area network (WLAN), a wide area network (WAN), a BLUETOOTH™ network, and the Internet. The modem 624 can be configured to support any type of communications protocol desired. The processor 602 may also be configured to access the display controller(s) 620 over the system bus 606 to control information sent to one or more display(s) 622. The display(s) 622 can include any type of display, including, but not limited to, a cathode ray tube (CRT), a liquid crystal display (LCD), a plasma display, etc.

The processor-based device 600 in FIG. 6 may include a set of instructions 628 that may be executed by the processor 602 for any application desired according to the instructions. The instructions 628 may be stored in the system memory 608, processor 602, and/or instruction cache 604 as examples of non-transitory computer-readable medium 630. The instructions 628 may also reside, completely or at least partially, within the system memory 608 and/or within the processor 602 during their execution. The instructions 628 may further be transmitted or received over the network 626 via the modem 624, such that the network 626 includes the computer-readable medium 630.

While the computer-readable medium 630 is shown in an exemplary embodiment to be a single medium, the term "computer-readable medium" should be taken to include a single medium or multiple media (e.g., a centralized or distributed database, and/or associated caches and servers) that store the one or more sets of instructions 628. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:

a first cache memory device and a second cache memory device, wherein the first cache memory device has a faster access time and a smaller capacity than the second cache memory device;

a location-based prefetcher circuit associated with the first cache memory device, the location-based prefetcher circuit comprising a prefetcher array comprising a plurality of prefetcher array entries;

the plurality of prefetcher array entries comprising a corresponding plurality of trigger memory addresses and a corresponding plurality of target identifiers;

each target identifier of the plurality of target identifiers comprising a set indicator and a way indicator; and the location-based prefetcher circuit configured to:

identify an association between a first memory address of a first memory access request and a second memory address of a subsequent second memory access request;

determine a set and a way of the second cache memory device in which data corresponding to the second memory address is stored; and store, in a prefetcher array entry of the plurality of prefetcher array entries, the first memory address as a trigger memory address of the prefetcher array entry, and a set indicator and a way indicator of the set and the way, respectively, of the second cache memory device as the target identifier of the prefetcher array entry, wherein the location-based prefetcher circuit is external to the second cache memory device such that storing the trigger memory address and the target identifier in the prefetcher array entry does not modify data stored in the second cache memory device.

2. The processor-based device of claim 1, wherein:

the set indicator comprises a number N of bits, wherein N is the binary logarithm of a count of sets of the second cache memory device; and the way indicator comprises a number W of bits, wherein W is the binary logarithm of a count of ways of the second cache memory device.

3. The processor-based device of claim 1, wherein:
the location-based prefetcher circuit further comprises a memory references history list;
the location-based prefetcher circuit is further configured to:
observe a plurality of memory access requests; and
store, in the memory references history list, a corresponding memory address for each memory access request of the plurality of memory access requests; and
the location-based prefetcher circuit is configured to identify the association between the first memory address of the first memory access request and the second memory address of the subsequent second memory access request based on the memory references history list.

4. The processor-based device of claim 1, wherein the location-based prefetcher circuit is further configured to:
observe a third memory access request to the first memory address;
determine that the first memory address corresponds to the trigger memory address of the prefetcher array entry;
retrieve the set indicator and the way indicator of the target identifier of the prefetcher array entry; and
retrieve, from the second cache memory device, the data corresponding to the second memory address stored in the set and the way of the second cache memory device identified by the set indicator and the way indicator, respectively.

5. The processor-based device of claim 4, wherein:
the location-based prefetcher circuit further comprises a prefetcher buffer comprising a plurality of prefetcher buffer entries; and
the location-based prefetcher circuit is further configured to store the second memory address and the data corresponding to the second memory address in a prefetcher buffer entry of the plurality of prefetcher buffer entries of the prefetcher buffer.

6. The processor-based device of claim 5, wherein the location-based prefetcher circuit is further configured to:
observe a fourth memory access request to the second memory address;
determine that the second memory address is stored in the prefetcher buffer entry of the plurality of prefetcher buffer entries of the prefetcher buffer; and
responsive to determining that the second memory address is stored in the prefetcher buffer entry of the plurality of prefetcher buffer entries of the prefetcher buffer, promote the prefetcher buffer entry from the prefetcher buffer to the first cache memory device.

7. The processor-based device of claim 5, wherein:
the plurality of prefetcher array entries further comprise a corresponding plurality of confidence values; and
the location-based prefetcher circuit is further configured to:
decrement a confidence value for the prefetcher array entry responsive to detection of a negative confidence event, wherein the negative confidence event comprises one of:
removal of the prefetcher buffer entry from the prefetcher buffer without promotion to the first cache memory device; and
a memory access request hit on both the first cache memory device and the prefetcher buffer; and
increment a confidence value for the prefetcher buffer entry responsive to detection of a positive confidence event, wherein the positive confidence event comprises promotion of the prefetcher buffer entry to the first cache memory device.

8. The processor-based device of claim 7, wherein the location-based prefetcher circuit is further configured to:
determine that the confidence value for the prefetcher array entry is less than a confidence threshold; and
responsive to determining that the confidence value for the prefetcher array entry is less than the confidence threshold, deleting the prefetcher array entry.

9. The processor-based device of claim 5, wherein:
the location-based prefetcher circuit further comprises a prefetcher filter comprising a plurality of target locations corresponding to a plurality of recent prefetches;
the location-based prefetcher circuit is further configured to, prior to retrieving the data corresponding to the second memory address, determine that a target location corresponding to the second memory address is not found among the plurality of target locations of the prefetcher filter; and
the location-based prefetcher circuit is configured to retrieve the data corresponding to the second memory address responsive to determining that the target location corresponding to the second memory address is not found among the plurality of target locations of the prefetcher filter.

10. The processor-based device of claim 9, wherein:
the location-based prefetcher circuit further comprises a throttling counter; and
the location-based prefetcher circuit is further configured to:
decrement the throttling counter responsive to detection of a positive cache performance event, wherein the positive cache performance event comprises one of:
a promotion from the prefetcher buffer to the first cache memory device; and
a memory access request miss on both the first cache memory device and the prefetcher buffer; and
increment the throttling counter responsive to detection of a negative cache performance event, wherein the negative cache performance event comprises one of:
a deletion without promotion from the prefetcher buffer;
a memory access request hit on both the first cache memory device and the prefetcher buffer; and
a memory access request hit on the prefetcher filter.

11. The processor-based device of claim 10, wherein the location-based prefetcher circuit is further configured to:
determine that the throttling counter exceeds a throttling threshold; and
responsive to determining that the throttling counter exceeds the throttling threshold, throttle prefetching by the location-based prefetcher circuit.

12. A method for providing location-based prefetching, comprising:
identifying, by a location-based prefetcher circuit associated with a first cache memory device of a processor-based device, an association between a first memory address of a first memory access request and a second memory address of a subsequent second memory access request;
determining, by the location-based prefetcher circuit, a set and a way of a second cache memory device in which data corresponding to the second memory address is stored, wherein the first cache memory device has a faster access time and a smaller capacity than the second cache memory device; and storing, by the location-based prefetcher circuit in a prefetcher array entry of a plurality of prefetcher array entries of a prefetcher array of the location-based prefetcher circuit, the first memory address as a trigger memory address of the prefetcher array entry, and a set indicator and a way indicator of the set and the way, respectively, of the second cache memory device as a target identifier of the prefetcher array entry, wherein the location-based prefetcher circuit is external to the second cache memory device such that storing the trigger memory address and the target identifier in the prefetcher array entry does not modify data stored in the second cache memory device.

13. The method of claim 12, further comprising:

observing, by the location-based prefetcher circuit, a plurality of memory access requests; and storing, by the location-based prefetcher circuit in a memory references history list, a corresponding memory address for each memory access request of the plurality of memory access requests, wherein identifying the association between the first memory address of the first memory access request and the second memory address of the subsequent second memory access request is based on the memory references history list.

14. The method of claim 12, further comprising:

observing, by the location-based prefetcher circuit, a third memory access request to the first memory address;

determining, by the location-based prefetcher circuit, that the first memory address corresponds to the trigger memory address of the prefetcher array entry;

retrieving, by the location-based prefetcher circuit, the set indicator and the way indicator of the target identifier of the prefetcher array entry; and retrieving, by the location-based prefetcher circuit from the second cache memory device, the data corresponding to the second memory address stored in the set and the way of the second cache memory device identified by the set indicator and the way indicator, respectively.

15. The method of claim 14, further comprising storing, by the location-based prefetcher circuit, the second memory address and the data corresponding to the second memory address in a prefetcher buffer entry of a plurality of prefetcher buffer entries of a prefetcher buffer.

16. The method of claim 15, further comprising:

observing, by the location-based prefetcher circuit, a fourth memory access request to the second memory address;

determining, by the location-based prefetcher circuit, that the second memory address is stored in the prefetcher buffer entry of the plurality of prefetcher buffer entries of the prefetcher buffer; and responsive to determining that the second memory address is stored in the prefetcher buffer entry of the plurality of prefetcher buffer entries of the prefetcher buffer, promoting, by the location-based prefetcher circuit, the prefetcher buffer entry from the prefetcher buffer to the first cache memory device.

17. The method of claim 15, wherein:

the plurality of prefetcher array entries further comprise a corresponding plurality of confidence values; and the method further comprises:

decrementing, by the location-based prefetcher circuit, a confidence value for the prefetcher array entry responsive to detection of a negative confidence event, wherein the negative confidence event comprises one of:

removal of the prefetcher buffer entry from the prefetcher buffer without promotion to the first cache memory device; and a memory access request hit on both the first cache memory device and the prefetcher buffer;

determining, by the location-based prefetcher circuit, that the confidence value for the prefetcher array entry is less than a confidence threshold; and responsive to determining that the confidence value for the prefetcher array entry is less than the confidence threshold, deleting, by the location-based prefetcher circuit, the prefetcher array entry.

18. The method of claim 15, further comprising:

prior to retrieving the data corresponding to the second memory address, determining, by the location-based prefetcher circuit, that a target location corresponding to the second memory address is not found among a plurality of target locations of a prefetcher filter, the plurality of target locations corresponding to a plurality of recent prefetches, wherein retrieving the data corresponding to the second memory address is responsive to determining that the target location corresponding to the second memory address is not found among the plurality of target locations of the prefetcher filter.

19. The method of claim 18, further comprising:

incrementing, by the location-based prefetcher circuit, a throttling counter responsive to detection of a negative cache performance event, wherein the negative cache performance event comprises one of:

a deletion without promotion from the prefetcher buffer;

a memory access request hit on both the first cache memory device and the prefetcher buffer; and a memory access request hit on the prefetcher filter;

determining, by the location-based prefetcher circuit, that the throttling counter exceeds a throttling threshold; and responsive to determining that the throttling counter exceeds the throttling threshold, throttling prefetching by the location-based prefetcher circuit.

20. A non-transitory computer-readable medium having stored thereon computer-executable instructions which, when executed by a processor, cause the processor to provide location-based prefetching for a first cache memory device by causing the processor to:

identify an association between a first memory address of a first memory access request and a second memory address of a subsequent second memory access request;

determine a set and a way of a second cache memory device in which data corresponding to the second memory address is stored, wherein the first cache memory device has a faster access time and a smaller capacity than the second cache memory device; and store, in a prefetcher array entry of a plurality of prefetcher array entries of a prefetcher array of a location-based prefetcher circuit, the first memory address as a trigger memory address of the prefetcher array entry, and a set indicator and a way indicator of the set and the way, respectively, of the second cache memory device as a target identifier of the prefetcher array entry, wherein the location-based prefetcher circuit is external to the second cache memory device such that storing the trigger memory address and the target identifier in the prefetcher array entry does not modify data stored in the second cache memory device.

* * * * *